(12) United States Patent
Lin et al.

(10) Patent No.: US 11,329,553 B2
(45) Date of Patent: May 10, 2022

(54) SWITCHING POWER CONVERSION CIRCUIT AND SWITCHING CIRCUIT

(71) Applicant: Richtek Technology Corporation, Zhubei (TW)

(72) Inventors: Shui-Mu Lin, Taichung (TW); Tsung-Wei Huang, Taipei (TW); Huan-Chien Yang, New Taipei (TW); Yung-Chun Chuang, Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 17/022,167

(22) Filed: Sep. 16, 2020

(65) Prior Publication Data
US 2021/0226530 A1 Jul. 22, 2021

(30) Foreign Application Priority Data
Jan. 21, 2020 (TW) .................................. 109102320

(51) Int. Cl.
*H02M 3/07* (2006.01)
(52) U.S. Cl.
CPC ..................... *H02M 3/07* (2013.01)

(58) Field of Classification Search
CPC ........................................................ H02M 3/07
See application file for complete search history.

(56) References Cited

U.S. PATENT DOCUMENTS

| 7,812,579 | B2 | 10/2010 | Williams |
| 10,050,515 | B1 * | 8/2018 | Chakraborty ......... H02M 7/483 |
| 2008/0157732 | A1 | 7/2008 | Williams |

* cited by examiner

*Primary Examiner* — Sibin Chen
(74) *Attorney, Agent, or Firm* — Tung & Associates

(57) ABSTRACT

A switching power conversion circuit includes a conversion capacitor, a capacitive power conversion circuit, an inductor, an inductive power conversion circuit and a switching control circuit. The capacitive power conversion circuit includes plural switching devices for generating an intermediate voltage which is in a predetermined proportional relationship to the input voltage. The inductive power conversion circuit includes plural switching devices for converting the intermediate voltage to an output voltage. The plural switching devices of the capacitive power conversion circuit and the inductive power conversion circuit switch the conversion capacitor and the inductor periodically according to the duty ratio of the switching control signal generated by the switching control circuit. The capacitive power conversion circuit and the inductive power conversion circuit share one of the plural switching devices.

20 Claims, 7 Drawing Sheets

SWITCHING POWER CONVERSION CIRCUIT AND SWITCHING CIRCUIT

CROSS REFERENCE

The present invention claims priority to TW 109102320 filed on Jan. 21, 2020.

BACKGROUND OF THE INVENTION

Field of Invention

The present invention relates to a switching power conversion circuit; particularly, it relates to such switching power conversion circuit capable of performing both capacitive power conversion and inductive power conversion, with high power conversion efficiency. The present invention also relates to a switching circuit for use in the above-mentioned switching power conversion circuit.

Description of Related Art

Please refer to FIG. 1A, which shows a schematic block diagram of a conventional switching power conversion circuit (i.e., switching power conversion circuit 1). The switching power conversion circuit 1 comprises: a switching control circuit 10, a charge pump circuit 11 and a buck switching power conversion circuit 12. The switching control circuit 10 is configured to operably generate switching control signals dDUTY, dDUTYB and dPWMB. The charge pump circuit 11 includes switches SW1, SW3, SW4 and SW5 and capacitors C1' and C2'. The switches SW1, SW3, SW4 and SW5 switch the capacitors C1' and C2' according to the switching control signal dDUTY or dDUTYB, to convert an input voltage Vin to an intermediate voltage VCP, wherein the intermediate voltage VCP is approximately 2-fold of the input voltage Vin. The buck switching power conversion circuit 12 includes switches SW2 and SWH, and an inductor L' and an output capacitor Co'. The switches SW2 and SWH are configured to operably switch the inductor L' according to the switching control signal dPWMB, to convert the intermediate voltage VCP to an output voltage Vout. The output voltage Vout has a level which is approximately equal to the level of the intermediate voltage multiplied by a predetermined voltage scale-down factor, wherein the predetermined voltage scale-down factor is smaller than one. A ratio between the output voltage Vout and the input voltage Vin is correlated to a duty ratio of the switching control signal dPWMB. Please refer to FIG. 1B, which shows operational waveforms in the circuit of FIG. 1A. Because the charge pump circuit 11 and the buck switching power conversion circuit 12 can be regarded as two power conversion circuits which are independent to each other, the duty ratio of the switching control signal dDUTY can be different from the duty ratio of the switching control signal dPWMB. From another perspective, the duty ratio of the switching control signal dDUTY is irrelevant to the duty ratio of the switching control signal dPWMB. Besides, the switching frequency of the switching control signal dDUTY can be different from or irrelevant to the switching frequency of the switching control signal dPWMB.

It is noteworthy that, in the prior art shown in FIG. 1A, the intermediate voltage VCP is a stable non-pulse-waveform voltage, whereas, the switching voltage VLX' is a voltage in pulse waveform. In this prior art shown in FIG. 1A, the switching voltage VLX' switches between the intermediate voltage VCP and a ground voltage level.

As compared to the prior art in FIG. 1, the present invention is advantageous in that: the present invention can achieve a better efficacy than the prior art by less number of components, so that the efficiency is improved and the manufacturing cost is reduced.

SUMMARY OF THE INVENTION

From one perspective, the present invention provides a switching power conversion circuit, comprising: a conversion capacitor; a capacitive power conversion circuit including a plurality of switching devices, wherein the plurality of switching devices of the capacitive power conversion circuit are configured to operably switch the conversion capacitor according to a switching control signal, to convert an input voltage to an intermediate voltage; wherein the plurality of switching devices of the capacitive power conversion circuit include a first switching device, and wherein the intermediate voltage is in a predetermined proportional relationship to the input voltage; an inductor; an inductive power conversion circuit including a plurality of switching devices, wherein the plurality of switching devices of the inductive power conversion circuit are configured to operably switch the inductor according to the switching control signal, to convert the intermediate voltage to an output voltage; wherein the plurality of switching devices of the inductive power conversion circuit include the first switching device; and a switching control circuit, which is configured to operably generate the switching control signal; wherein the plurality of switching devices of the capacitive power conversion circuit periodically switch a coupling relationship of the conversion capacitor according to a duty ratio of the switching control signal among a proportional voltage node, the input voltage and a ground voltage level, so as to generate the intermediate voltage at a first end of the conversion capacitor, wherein the intermediate voltage has a pulse waveform; wherein the plurality of switching devices of the inductive power conversion circuit periodically switch a coupling relationship of the inductor according to the duty ratio of the switching control signal among the intermediate voltage, the output voltage and the ground voltage level, so as to generate the output voltage, wherein a first end of the inductor is coupled to the proportional voltage node; wherein a ratio between the output voltage and a high level of the intermediate voltage is correlated to the duty ratio.

In one embodiment, the inductive power conversion circuit is configured as a buck switching power conversion circuit, wherein the plurality of switching devices of the inductive power conversion circuit further include a second switching device, wherein the first switching device is coupled between the first end of the conversion capacitor and the proportional voltage node, wherein a second end of the inductor is coupled to the output voltage, and wherein the second switching device is coupled between the proportional voltage node and the ground voltage level; wherein the capacitive power conversion circuit is configured as a charge pump, wherein the high level of the intermediate voltage is higher than the input voltage; wherein during a duty period, the first switching device turns ON a connection path between the first end of the conversion capacitor and the proportional voltage node, and also turns ON a connection path between the first end of the inductor and the intermediate voltage, wherein the duty period is an ON period of the first switching device according to the duty ratio.

In one embodiment, a level of the input voltage is selectable to be greater than or smaller than a level of the output voltage.

In one embodiment, the first switching device is a switch, whereas, the second switching device is a diode or a switch, wherein the first switching device and the second switching device operate according to the duty ratio of the switching control signal, so that the first end of the inductor is periodically coupled to the intermediate voltage or the ground voltage level, thus causing a level of the output voltage to be approximately equal to the high level of the intermediate voltage multiplied by a predetermined voltage scale-down factor, wherein the predetermined voltage scale-down factor is smaller than one.

In one embodiment, the plurality of switching devices of the capacitive power conversion circuit further include: a third switching device coupled between the input voltage and the first end of the conversion capacitor; a fourth switching device coupled between the input voltage and the second end of the conversion capacitor; and a fifth switching device coupled between the second end of the conversion capacitor and the ground voltage level; wherein the first, the third, the fourth and the fifth switching devices operate according to the duty ratio of the switching control signal, so that the conversion capacitor is periodically coupled between the input voltage and the ground voltage level or between the proportional voltage node and the input voltage, thus causing the high level of the intermediate voltage to be approximately equal to a level of the input voltage multiplied by a predetermined voltage scale-up factor, wherein the predetermined voltage scale-up factor is greater than one.

In one embodiment, the predetermined voltage scale-up factor is two.

In one embodiment, a low level of the intermediate voltage is approximately equal to the level of the input voltage.

In one embodiment, during the duty period, the intermediate voltage has the high level, and during a non-duty period, the intermediate voltage has a low level; wherein the non-duty period is an OFF period of the first switching device according to the duty ratio.

In one embodiment, the third, the fourth and the fifth switching devices are switches; wherein during the duty period, the first and the fourth switching devices are controlled to be ON, and the second, the third and the fifth switching devices are controlled to be OFF, so that a connection path between the input voltage and the second end of the conversion capacitor and a connection path between the first end of the conversion capacitor and the proportional voltage node are conductive, thus causing the intermediate voltage to have the high level and the first end of the inductor to have the high level; during the non-duty period, the second, the third and the fifth switching devices are controlled to be ON, and the first and the fourth switching devices are controlled to be OFF, so that a connection path between the input voltage and the first end of the conversion capacitor, a connection path between the second end of the conversion capacitor and the ground voltage level and a connection path between the first end of the inductor and the ground voltage level are conductive, thus causing the intermediate voltage to have the low level and the first end of the inductor to have the low level.

In one embodiment, the first, the third and the fourth switching devices are PMOS transistors, whereas, the second and the fifth switching devices are NMOS transistors.

In one embodiment, there is one and only one switch between the first end of the inductor and the first end of the conversion capacitor, and the first switching device corresponds to this one and only one switch.

From another perspective, the present invention provides a switching circuit, comprising: a capacitive power conversion circuit including a plurality of switching devices, wherein the plurality of switching devices of the capacitive power conversion circuit are configured to operably switch a conversion capacitor according to a switching control signal, to convert an input voltage to an intermediate voltage; wherein the plurality of switching devices of the capacitive power conversion circuit include a first switching device, and wherein the intermediate voltage is in a predetermined proportional relationship to the input voltage; an inductive power conversion circuit including a plurality of switching devices, wherein the plurality of switching devices of the inductive power conversion circuit are configured to operably switch an inductor according to the switching control signal, to convert the intermediate voltage to an output voltage; wherein the plurality of switching devices of the inductive power conversion circuit include the first switching device; and a switching control circuit, which is configured to operably generate the switching control signal; wherein the plurality of switching devices of the capacitive power conversion circuit periodically switch a coupling relationship of the conversion capacitor according to a duty ratio of the switching control signal among a proportional voltage node, the input voltage and a ground voltage level, so as to generate the intermediate voltage at a first end of the conversion capacitor, wherein the intermediate voltage has a pulse waveform; wherein the plurality of switching devices of the inductive power conversion circuit periodically switch a coupling relationship of the inductor according to the duty ratio of the switching control signal among the intermediate voltage, the output voltage and the ground voltage level, so as to generate the output voltage, wherein a first end of the inductor is coupled to the proportional voltage node; wherein a ratio between the output voltage and a high level of the intermediate voltage is correlated to the duty ratio.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
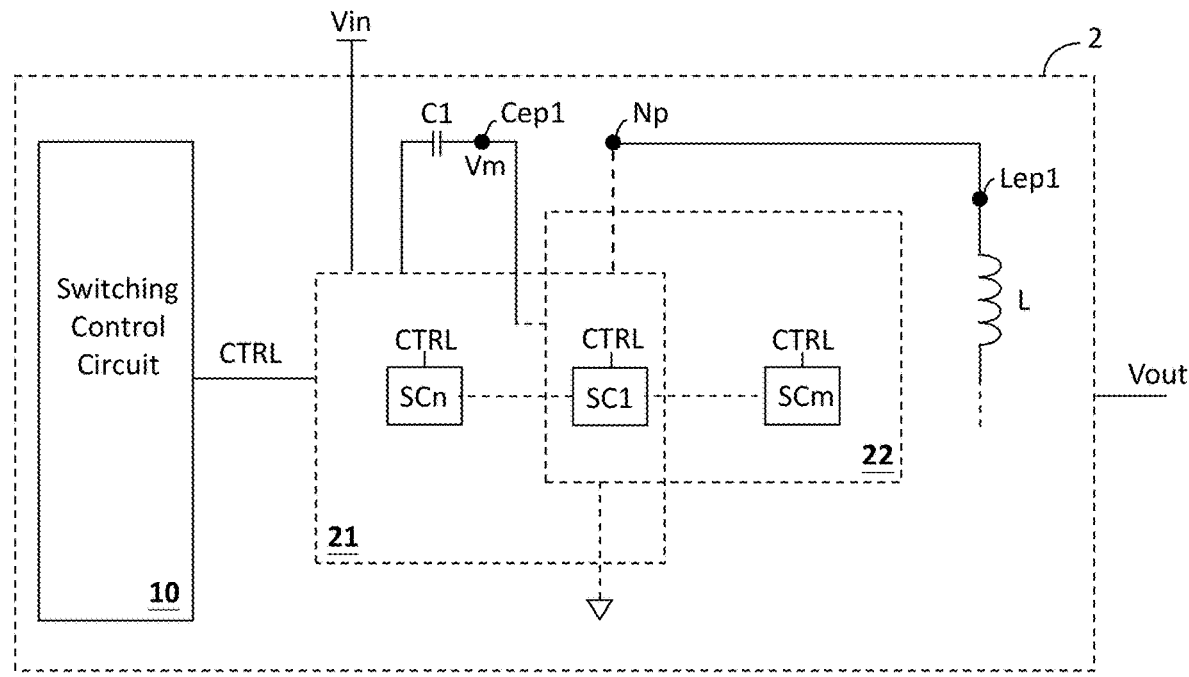
FIG. 2 shows a schematic block diagram of a switching power conversion circuit according to an embodiment of the present invention.

Please refer to FIG. 2, which shows a schematic block diagram of a switching power conversion circuit (i.e., switching power conversion circuit 2) according to an embodiment of the present invention. In one embodiment, as shown in FIG. 2, the switching power conversion circuit 2 comprises: a conversion capacitor C1, a capacitive power conversion circuit 21, an inductor L, an inductive power conversion circuit 22 and a switching control circuit 10.

In one embodiment, as shown in FIG. 2, the capacitive power conversion circuit 21 includes plural switching devices. The plural switching devices of the capacitive power conversion circuit 21 include first through n-th switching devices SC1~SCn, wherein n denotes an integer greater than one. The plural switching devices (i.e., switching devices SC1~SCn) of the capacitive power conversion circuit 21 are configured to operably switch the conversion capacitor C1 according to a switching control signal CTRL generated by the switching control circuit 10, to convert an input voltage Vin to an intermediate voltage Vm. The intermediate voltage Vm is in a predetermined proportional relationship to the input voltage Vin.

In one embodiment, as shown in FIG. 2, the inductive power conversion circuit 22 includes plural switching devices. The plural switching devices of the inductive power conversion circuit 22 include first through m-th switching devices SC1~SCm, wherein m denotes an integer greater than one. To be more specific, the first switching device SC1 is a switching device operating for the capacitive power conversion circuit 21 and is also a switching device operating for the inductive power conversion circuit 22. The plural switching devices (i.e., switching devices SC1~SCm) of the inductive power conversion circuit 22 are configured to operably switch the inductor L according to the switching control signal CTRL, to convert the intermediate voltage Vm to an output voltage Vout.

Please still refer to FIG. 2. In one embodiment, the switching control circuit 10 is configured to operably generate the switching control signal CTRL. In one embodiment, the plural switching devices (i.e., switching devices SC1~SCn) of the capacitive power conversion circuit 21 periodically switch a coupling relationship of the conversion capacitor C1 according to a duty ratio of the switching control signal CTRL among a proportional voltage node Np, the input voltage Vin and a ground voltage level, so as to generate the intermediate voltage Vm at a first end Cep1 of the conversion capacitor C1. The intermediate voltage Vm has a pulse waveform. That is, when the plural switching devices (i.e., switching devices SC1~SCn) are under operation, the intermediate voltage Vm has at least two levels. In one embodiment, the plural switching devices (i.e., switching devices SC1~SCm) of the inductive power conversion circuit 22 periodically switch a coupling relationship of the inductor L according to the duty ratio of the switching control signal CTRL among the intermediate voltage Vm, the output voltage Vout and the ground voltage level, so as to generate the output voltage Vout. The ratio between the output voltage Vout and a high level of the intermediate voltage Vm is correlated to the duty ratio. In one embodiment, a first end Lep1 of the inductor L is coupled to the proportional voltage node Np.

Figure 3:
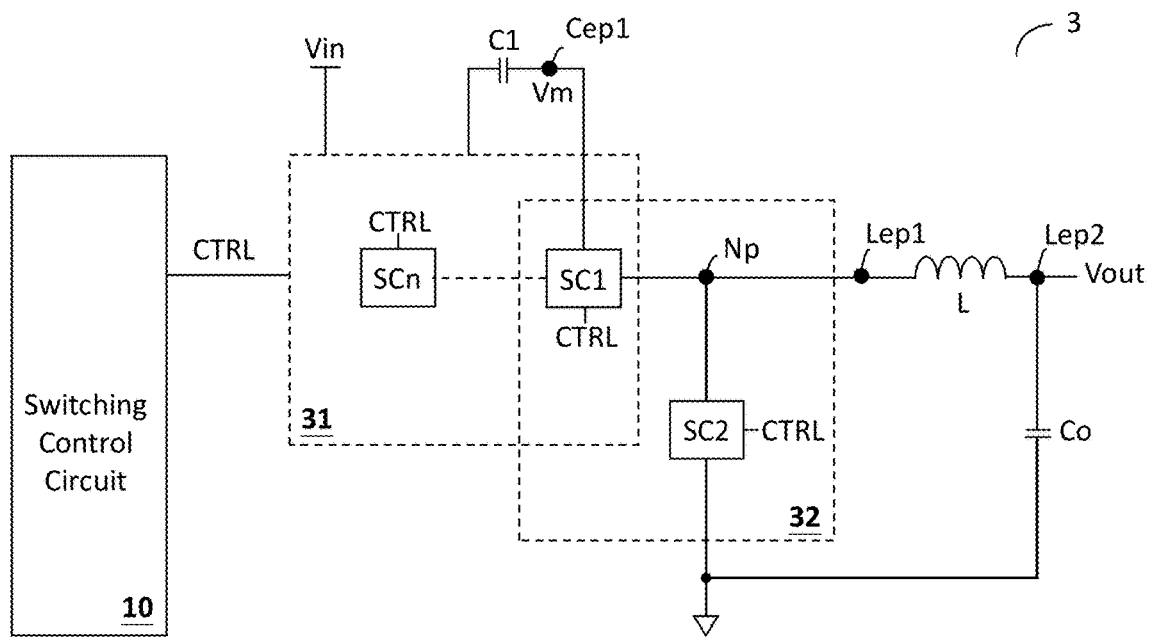
FIG. 3 shows a schematic diagram of a switching power conversion circuit according to an embodiment of the present invention.

Please refer to FIG. 3, which shows a schematic diagram of a switching power conversion circuit (i.e., switching power conversion circuit 3) according to an embodiment of the present invention. In one embodiment, as shown in FIG. 3, the inductive power conversion circuit 32 is configured as a buck switching power conversion circuit. In this embodiment, the plural switching devices of the inductive power conversion circuit 32 further include a second switching device SC2.

In one embodiment, as shown in FIG. 3, the first switching device SC1 is coupled between the first end Cep1 of the conversion capacitor C1 and the proportional voltage node Np. A second end Lep2 of the inductor L is coupled to the output voltage Vout. The second switching device SC2 is coupled between the proportional voltage node Np and the ground voltage level.

Please still refer to FIG. 3. In one embodiment, the capacitive power conversion circuit 31 is configured as a charge pump. In this embodiment, the high level of the intermediate voltage Vm is higher than the level of the input voltage Vin. From one perspective, the capacitive power conversion circuit 31 and the inductive power conversion circuit 32 share at least one common circuit component, and in this embodiment common the circuit component is the first switching device SC1. In one embodiment, the capacitive power conversion circuit 31 and the inductive power conversion circuit 32 share the first switching device SC1 by operations below: during a duty period (i.e., the ON period of the first switching device SC1 according to the duty ratio), the first switching device SC1 of the capacitive power conversion circuit 31 turns ON a connection path between the first end Cep1 of the conversion capacitor C1 and the proportional voltage node Np; and during this duty period, the first switching device SC1 of the inductive power conversion circuit 32 also turns ON a connection path between the first end Lep1 of the inductor L and the intermediate voltage Vm.

Figure 4A:
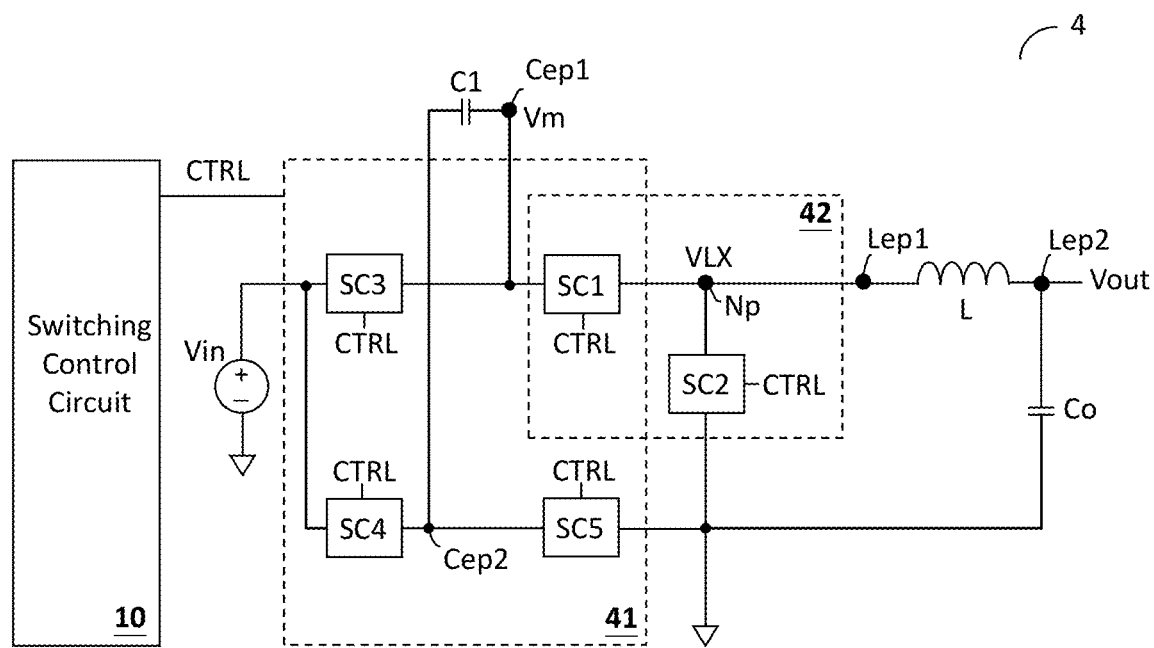
FIG. 4A shows a schematic diagram of a switching power conversion circuit according to a specific embodiment of the present invention.

Please refer to FIG. 4A, which shows a schematic diagram of a switching power conversion circuit (i.e., switching power conversion circuit 4) according to a specific embodiment of the present invention. In one embodiment, as shown in FIG. 4A, the capacitive power conversion circuit 41 further include: a third switching device SC3, a fourth switching device SC4 and a fifth switching device SC5.

In one specific embodiment, as shown in FIG. 4A, the third switching device SC3 is coupled between the input voltage Vin and the first end Cep1 of the conversion capacitor C1. The fourth switching device SC4 is coupled between the input voltage Vin and the second end Cep2 of the conversion capacitor C1. The fifth switching device SC5 is coupled between the second end Cep2 of the conversion capacitor C1 and the ground voltage level.

Figure 4B:
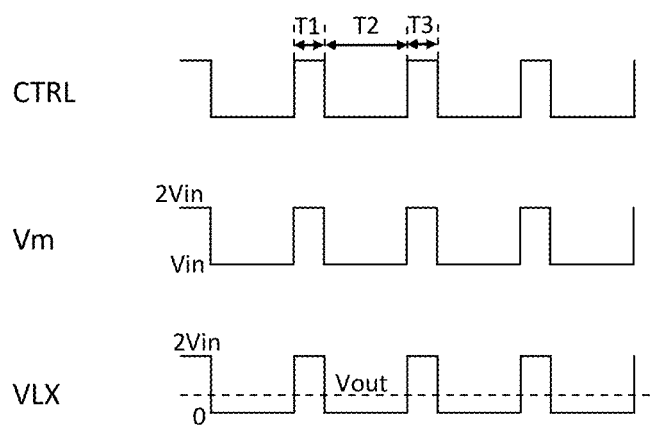
FIG. 4B shows operational waveforms in the circuit corresponding to FIG. 4A.

Please refer to FIG. 4A along with FIG. 4B. FIG. 4B shows operational waveforms in the circuit of FIG. 4A. In one embodiment, the first switching device SC1, the third switching device SC3, the fourth switching device SC4 and the fifth switching device SC5 operate according to the duty ratio of the switching control signal CTRL generated by the switching control circuit 10, so that the conversion capacitor C1 is periodically coupled between the input voltage Vin and the ground voltage level or between the proportional voltage node Np and the input voltage Vin, thus causing the high level of the intermediate voltage Vm to be approximately equal to a level of the input voltage Vin multiplied by a predetermined voltage scale-up factor. The predetermined voltage scale-up factor is greater than one (in this embodiment, the predetermined voltage scale-up factor can be, for example but not limited to, two).

In one embodiment, the inductive power conversion circuit 42 shown in FIG. 4A corresponds to for example the inductive power conversion circuit 32 shown in FIG. 3. The first switching device SC1 and the second switching device SC2 operate according to the duty ratio of the switching control signal CTRL, so that the first end Lep1 of the inductor L is periodically coupled to the intermediate voltage Vm or the ground voltage level, thus causing a level of the output voltage Vout to be approximately equal to the high level of the intermediate voltage Vm multiplied by a predetermined voltage scale-down factor. The predetermined voltage scale-down factor is smaller than one. It is noteworthy that, in one embodiment, the high level of a proportional voltage VLX at the proportional voltage node Np is approximately equal to the high level of the intermediate voltage Vm, whereas, a low level of the proportional voltage VLX at the proportional voltage node Np is approximately equal to the level of the ground voltage level. And, the level of the output voltage Vout is approximately equal to an average level of the proportional voltage VLX, which is correlated with the duty ratio of the switching control signal CTRL. In this embodiment, the relationship between the level of the output voltage Vout and the level of the proportional voltage VLX for example can be represented as: Vout=2*Vin*D, wherein D denotes the duty ratio of the switching control signal CTRL. In this embodiment, the duty ratio of the switching control signal CTRL for example can be T1/(T1+T2).

In more detail, in the capacitive power conversion circuit 41, during a non-duty period (e.g., as shown by period T2 in FIG. 4B), the third switching device SC3 and the fifth switching device SC5 are controlled to be ON, and the first switching device SC1 and the fourth switching device SC4 are controlled to be OFF. Under such situation, the conversion capacitor C1 is correspondingly coupled between the input voltage Vin and the ground voltage level, so that a connection path between the input voltage Vin and the first end Cep1 of the conversion capacitor C1 and a connection path between the second end Cep2 of the conversion capacitor C1 and the ground voltage level are conductive. That is, the conversion capacitor C1 is charged to a level of the input voltage Vin via the third switching device SC3 and the fifth switching device SC5, thus causing the intermediate voltage Vm to have a low level (in this embodiment, as shown by period T2 in FIG. 4B, the low level of the intermediate voltage is approximately equal to the level of the input voltage). On the other hand, in the inductive power conversion circuit 42, during a non-duty period (e.g., as shown by period T2 in FIG. 4B), the second switching device SC2 is controlled to be ON, and the first switching device SC1 is controlled to be OFF. Under such situation, the proportional voltage VLX at the proportional voltage node Np has a ground voltage level. In other words, during a non-duty period, because the first end Lep1 of the inductor L is correspondingly coupled to the ground voltage level, the first end Lep1 of the inductor L has a ground voltage level.

Next, in the capacitive power conversion circuit 41, during a duty period (e.g., as shown by period T3 or T1 in FIG. 4B), the first switching device SC1 and the fourth switching device SC4 are controlled to be ON, and the third switching device SC3 and the fifth switching device SC5 are controlled to be OFF. Under such situation, the conversion capacitor C1 is correspondingly coupled between the proportional voltage node Np and the input voltage Vin, so that a connection path between the input voltage Vin and the second end Cep2 of the conversion capacitor C1 and a connection path between the first end Cep1 of the conversion capacitor C1 and the proportional voltage node Np are conductive. As a consequence, the intermediate voltage Vm is pumped to a high level which is equal to the input voltage Vin plus a voltage stored in the conversion capacitor C1 (in this embodiment, the voltage stored in the conversion capacitor C1 is also equal to the input voltage Vin). In this embodiment, as shown in FIG. 4B, during a duty period (e.g., as shown by period T3 in FIG. 4B), the intermediate voltage Vm is pumped to 2Vin. On the other hand, in the inductive power conversion circuit 42, during a duty period (e.g., as shown by period T3 or T1 in FIG. 4B), the second switching device SC2 is controlled to be OFF, and the first switching device SC1 is controlled to be ON. Under such situation, the proportional voltage VLX at the proportional voltage node Np has a high level (i.e., 2Vin). In other words, during a duty period, because the first end Lep1 of the inductor L is correspondingly coupled to the intermediate voltage Vm, the first end Lep1 of the inductor L has a high level.

Please still refer to FIG. 4A. In one embodiment, the high level of the intermediate voltage Vm is approximately equal to a level of the input voltage Vin multiplied by a predetermined voltage scale-up factor, whereas, the level of the output voltage Vout is approximately equal to the high level of the intermediate voltage Vm multiplied by a predetermined voltage scale-down factor. As a result, the level of the input voltage Vin is selectable to be greater than or smaller than the level of the output voltage Vout; that is, the present invention can operate regardless whether the level of the input voltage Vin is greater than or smaller than the level of the output voltage Vout. In summary, the switching power conversion circuit of the present invention can function as a buck-boost switching power conversion circuit by a combination of the capacitive power conversion circuit and the inductive power conversion circuit; a buck-boost power conversion is achieved without adopting a conventional pure inductor type buck-boost switching power conversion circuit which is relatively more complicated.

Figure 5A:
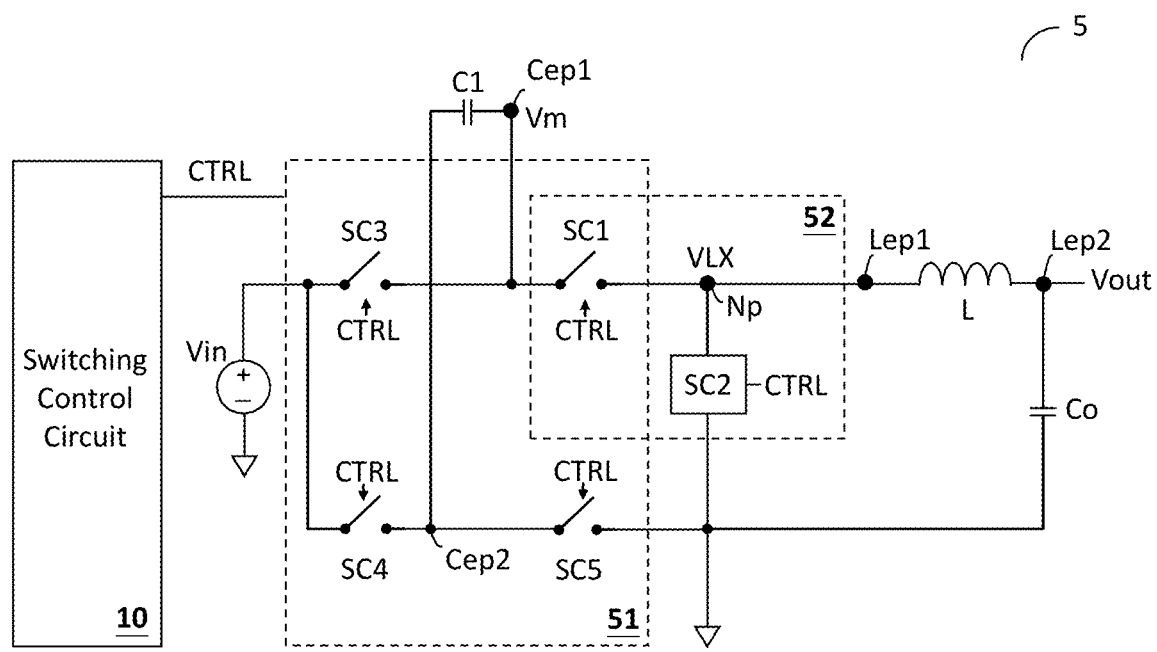
FIG. 5A shows a schematic diagram of a switching power conversion circuit according to a specific embodiment of the present invention.
Figure 5B:
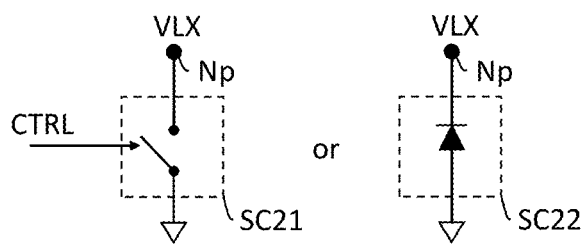
FIG. 5B shows two specific embodiments of a second switching device.

Please refer to FIG. 5A and FIG. 5B. FIG. 5A shows a schematic diagram of a switching power conversion circuit (i.e., switching power conversion circuit 5) according to a specific embodiment of the present invention. FIG. 5B shows two specific embodiments of a second switching device (i.e., second switching devices SC21 and SC22). In one embodiment, as shown in FIG. 5A, the first switching device SC1 is a switch. In one embodiment, the third switching device SC3, the fourth switching device SC4 and the fifth switching device SC5 of the capacitive power conversion circuit 51 are switches. This embodiment operates in a similar way as the previous embodiment of FIG. 4A, so the details thereof are not redundantly repeated here.

In one embodiment, as shown in FIG. 5B, the second switching device (e.g., corresponding to the second switching device SC2 shown in FIG. 5A) can be implemented as a diode (i.e., SC22) or a switch (i.e., SC21). It is noteworthy that, in one embodiment, under a situation where the second switching device SC2 is implemented as a diode (i.e., SC22), the switching control signal CTRL does not directly control whether the second switching device SC2 is conductive. Instead, whether the second switching device SC2 is conductive is determined by current direction.

Figure 6A:
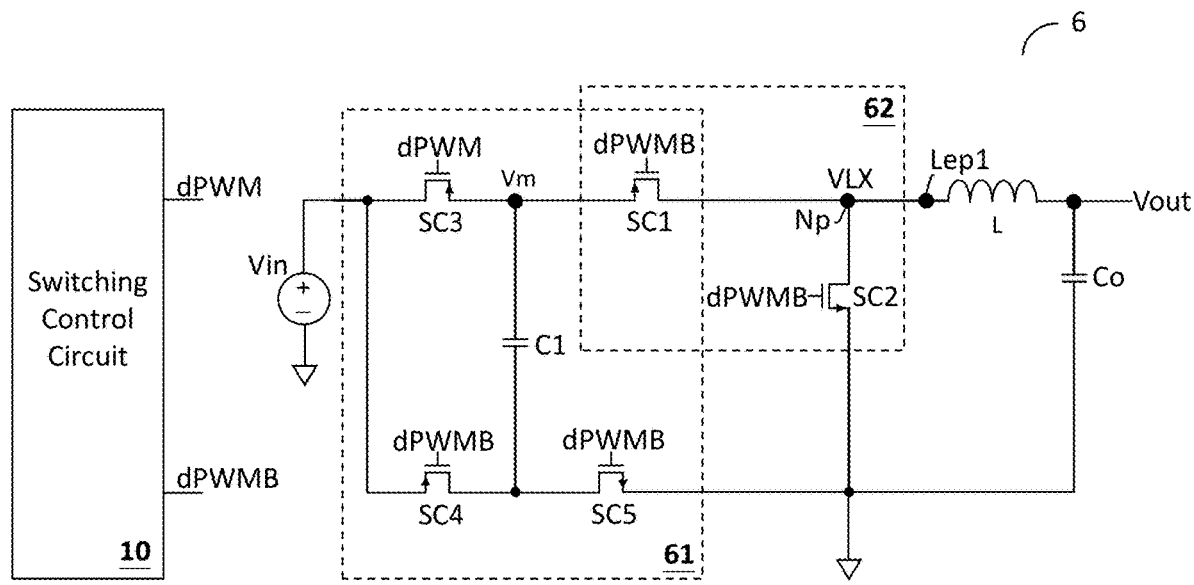
FIG. 6A shows a schematic diagram of a switching power conversion circuit according to a specific embodiment of the present invention.

Please refer to FIG. 6A, which shows a schematic diagram of a switching power conversion circuit (i.e., switching power conversion circuit 6) according to a specific embodiment of the present invention. In one embodiment, as shown in FIG. 6A, the first switching device SC1, the third switching device SC3 and the fourth switching device SC4 of the capacitive power conversion circuit 61 are PMOS transistors, whereas, the fifth switching device SC5 of the capacitive power conversion circuit 61 is an NMOS transistor. The second switching device SC2 of the inductive power conversion circuit 62 is an NMOS transistor.

Figure 6B:
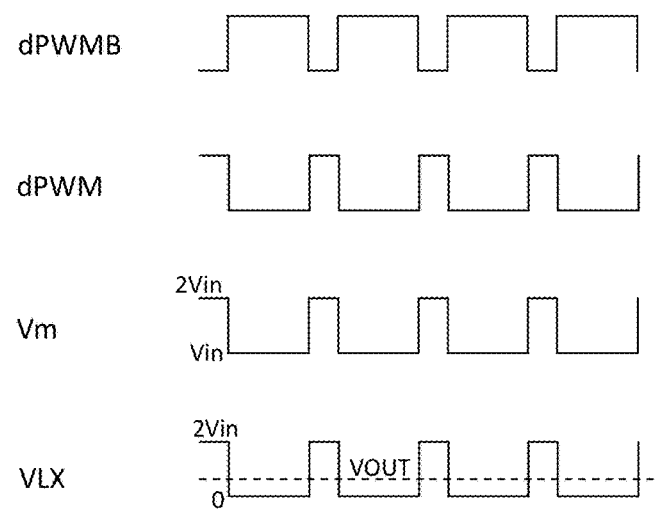
FIG. 6B shows operational waveforms in the circuit corresponding to FIG. 6A.

Please refer to FIG. 6A along with FIG. 6B. FIG. 6B shows operational waveforms in the circuit of FIG. 6A. In this embodiment, the switching control signal CTRL generated by the switching control circuit 10 includes a switching control signal dPWM and a switching control signal dPWMB. The switching control signal dPWM has the same phase as the switching control signal CTRL of the previous embodiment shown in FIG. 4B. The switching control signal dPWMB has the opposite phase to the switching control signal CTRL of the previous embodiment shown in FIG. 4B. In this embodiment, the first switching device SC1, the second switching device SC2, the fourth switching device SC4 and the fifth switching device SC5 operate according to the switching control signal dPWMB, whereas, the third switching device SC3 operate according to the switching control signal dPWM, so that the conversion capacitor C1 is periodically coupled between the input voltage Vin and the ground voltage level or between the proportional voltage node Np and the input voltage Vin and so that the first end Lep1 of the inductor L is periodically coupled to the intermediate voltage Vm or the ground voltage level. This embodiment operates in the same way and has same efficacy as the previous embodiment shown in FIG. 4A, so the details thereof are not redundantly repeated here.

Figure 7:
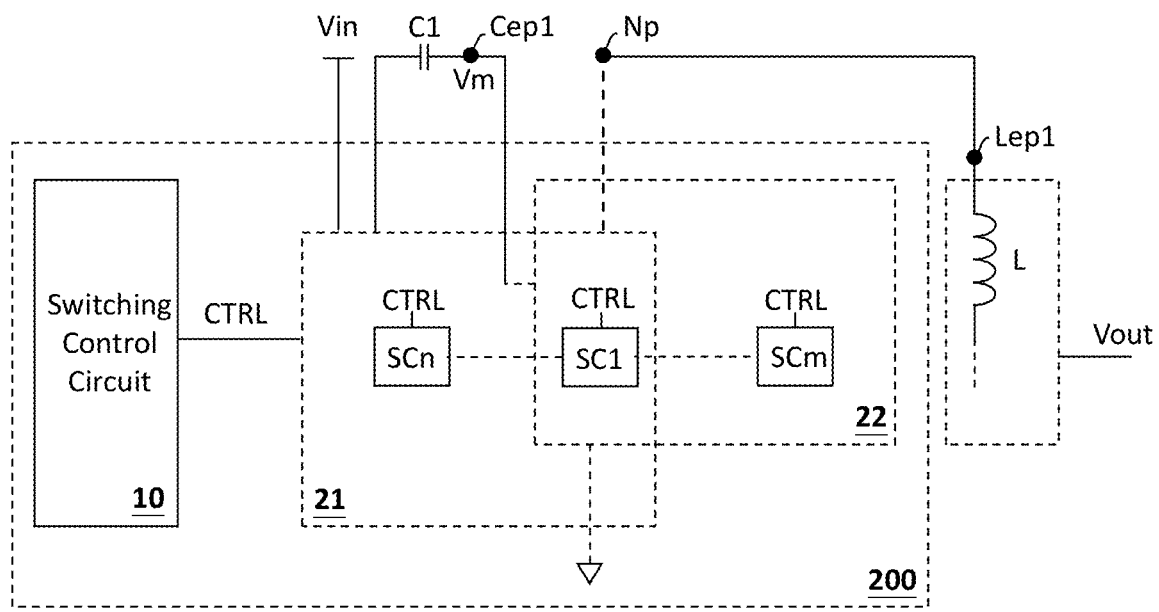
FIG. 7 shows a schematic block diagram of a switching circuit according to an embodiment of the present invention.

From another perspective, the present invention also provides a switching circuit. Please refer to FIG. 7, which shows a schematic block diagram of a switching circuit (i.e., switching circuit 200) according to an embodiment of the present invention. In one embodiment, as shown in FIG. 7, the switching circuit 200 comprises: a capacitive power conversion circuit 21, an inductive power conversion circuit 22 and a switching control circuit 10. The switching control circuit 10 is configured to operably generate a switching control signal CTRL, to control the switching devices SC1~SCn of the capacitive power conversion circuit 21. In addition, the switching control signal CTRL is configured to operably control the switching devices SC1~SCm of the inductive power conversion circuit 22. In one embodiment, the switching circuit 200 is configured to operably switch a conversion capacitor C1 and an inductor L. The operation details as to how the switching circuit 200 of this embodiment switches the conversion capacitor C1 and the inductor L are the same as the previous embodiments shown in FIG. 2 through FIG. 6A, so the details thereof are not redundantly repeated here.

Figure 1A:
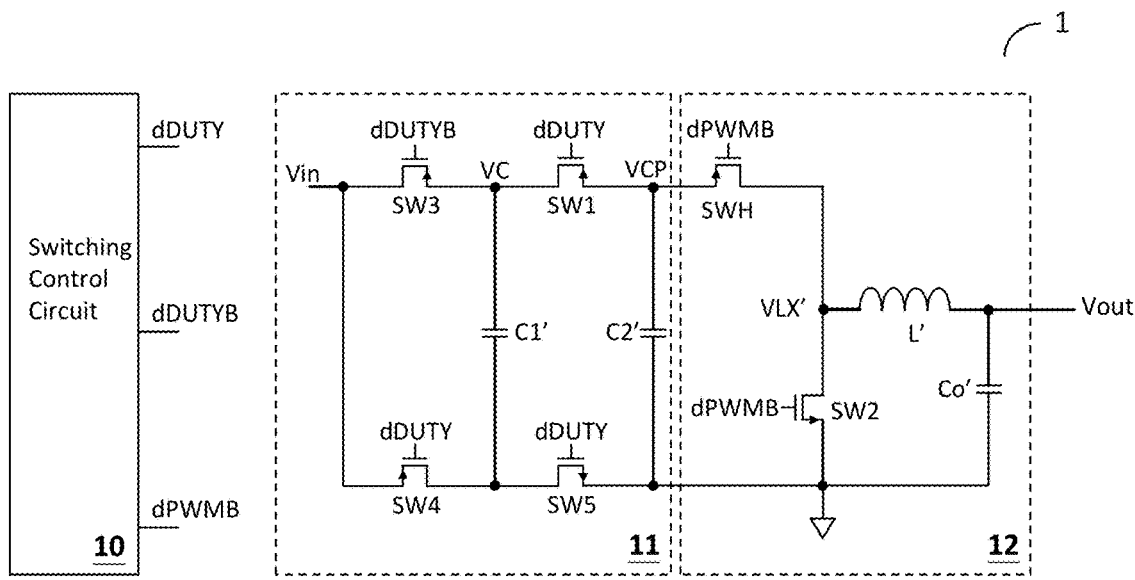
FIG. 1A shows a conventional switching power conversion circuit.
Figure 1B:
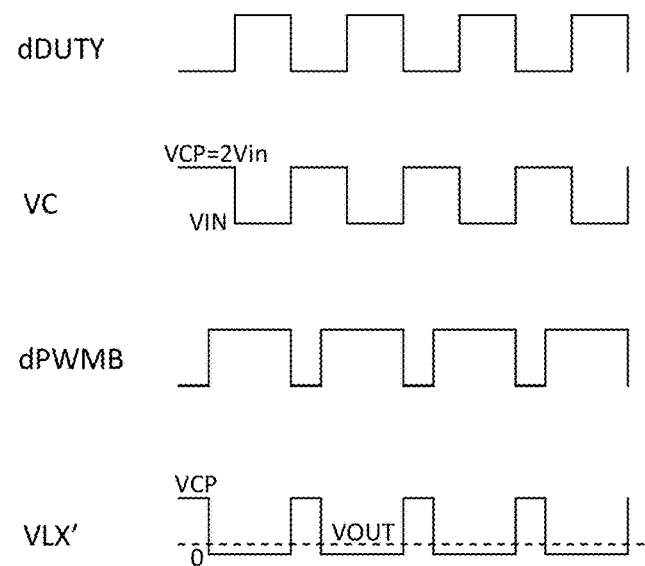
FIG. 1B shows operational waveforms in the circuit of FIG. 1A.
Figure 8:
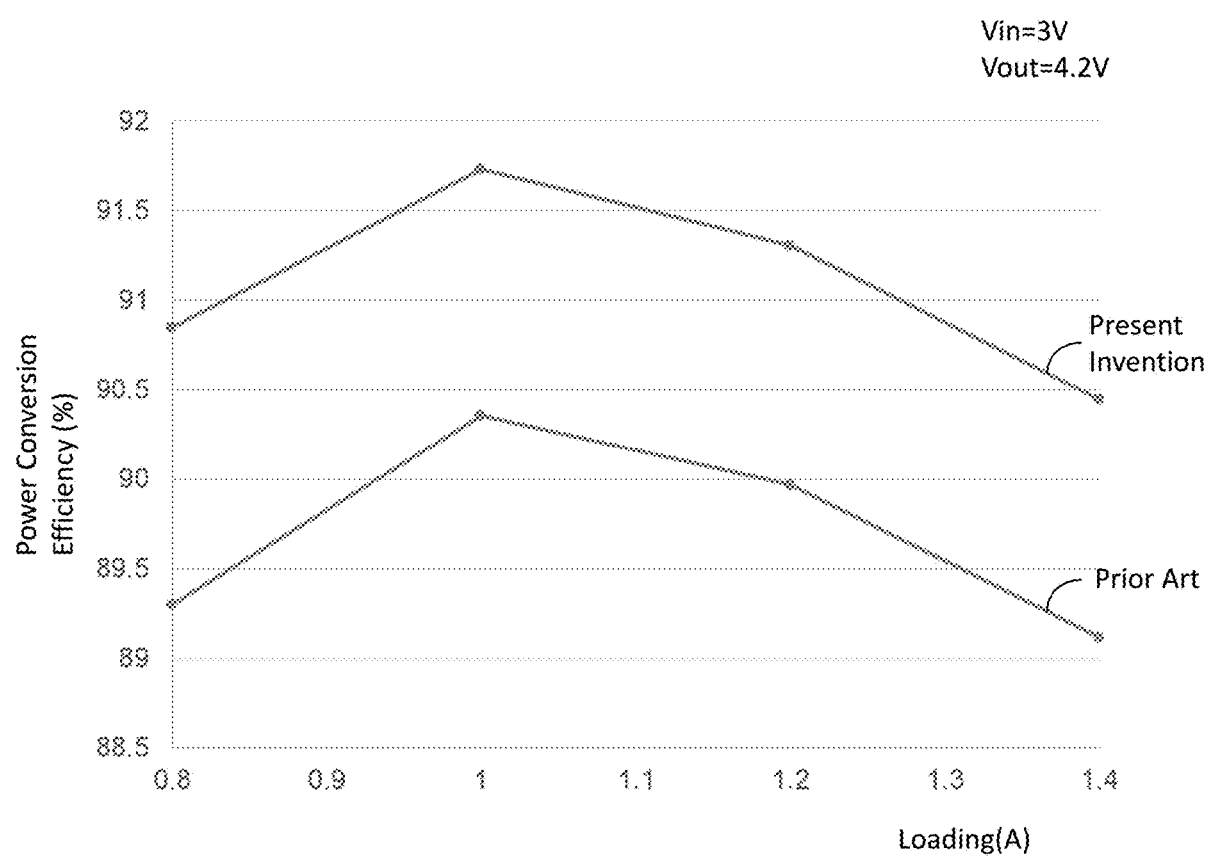
FIG. 8 shows a diagram illustrating power conversion efficiency versus different loadings in the prior art and the present invention.

It is noteworthy that, as compared to the prior art shown in FIG. 1A, because the switching power conversion circuit (e.g., switching power conversion circuits 3 to 6) of the present invention share the first switching device SC1, the present invention can reduce at least one capacitor (i.e., the capacitor C2' shown in FIG. 1A can be omitted) and at least one switch (i.e., the switch SW1 and the switch SWH shown in FIG. 1A can be merged to become the first switching device SC1 of the present invention), thus effectively saving the cost. Moreover, because the number of the switches on the power path is reduced, the ON-resistance of the switches is reduced, thus enhancing the power conversion efficiency. Please refer to FIG. 8, which shows a diagram illustrating power conversion efficiency versus different loadings in the prior art and the present invention. As shown in FIG. 8, the switching power conversion circuit of the present invention has better power conversion efficiency over the prior art. Furthermore, in the present invention, because all switching devices in the switching power conversion circuit, the capacitive power conversion circuit 21 and the inductive power conversion circuit 22 can operate according to the switching control signals CTRL, dPWM and dPWMB which are correlated with one another, the complexity in control is greatly simplified.

Note that the term "approximately", as used in the context of the present invention, means that: because there are imperfect matchings among the components, and there are also deviations during manufacture of the components, errors within a tolerable range is acceptable.

present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching power conversion circuit, comprising:
   a conversion capacitor;
   a capacitive power conversion circuit including a plurality of switching devices, wherein the plurality of switching devices of the capacitive power conversion circuit are configured to operably switch the conversion capacitor according to a switching control signal, to convert an input voltage to an intermediate voltage; wherein the plurality of switching devices of the capacitive power conversion circuit include a first switching device, and wherein the intermediate voltage is in a predetermined proportional relationship to the input voltage;

an inductor;

an inductive power conversion circuit including a plurality of switching devices, wherein the plurality of switching devices of the inductive power conversion circuit are configured to operably switch the inductor according to the switching control signal, to convert the intermediate voltage to an output voltage; wherein the plurality of switching devices of the inductive power conversion circuit include the first switching device; and a switching control circuit, which is configured to operably generate the switching control signal;

wherein the plurality of switching devices of the capacitive power conversion circuit periodically switch a coupling relationship of the conversion capacitor according to a duty ratio of the switching control signal among a proportional voltage node, the input voltage and a ground voltage level, so as to generate the intermediate voltage at a first end of the conversion capacitor, wherein the intermediate voltage has a pulse waveform; wherein the plurality of switching devices of the inductive power conversion circuit periodically switch a coupling relationship of the inductor according to the duty ratio of the switching control signal among the intermediate voltage, the output voltage and the ground voltage level, so as to generate the output voltage, wherein a first end of the inductor is coupled to the proportional voltage node;

wherein a ratio between the output voltage and a high level of the intermediate voltage is correlated to the duty ratio;

wherein the inductive power conversion circuit is configured as a buck switching power conversion circuit, wherein the plurality of switching devices of the inductive power conversion circuit further include a second switching device, wherein the first switching device is coupled between the first end of the conversion capacitor and the proportional voltage node, wherein a second end of the inductor is coupled to the output voltage, and wherein the second switching device is coupled between the proportional voltage node and the ground voltage level;

wherein the capacitive power conversion circuit is configured as a charge pump, wherein the first end of the conversion capacitor is coupled to the input voltage during a first time period of a switching cycle, and a second end of the conversion capacitor is coupled to the input voltage during a second time period of the switching cycle, such that the intermediate voltage is pumped to the high level through a voltage across the conversion capacitor plus the input voltage, so as to render the high level of the intermediate voltage to be higher than the input voltage;

wherein during a duty period, the first switching device turns ON a connection path between the first end of the conversion capacitor and the proportional voltage node, and also turns ON a connection path between the first end of the inductor and the intermediate voltage, wherein the duty period is an ON period of the first switching device according to the duty ratio.

2. The switching power conversion circuit of claim 1, wherein a level of the input voltage is selectable to be greater than or smaller than a level of the output voltage.

3. The switching power conversion circuit of claim 1, wherein the first switching device is a switch, whereas, the second switching device is a diode or a switch, wherein the first switching device and the second switching device operate according to the duty ratio of the switching control signal, so that the first end of the inductor is periodically coupled to the intermediate voltage or the ground voltage level, thus causing a level of the output voltage to be approximately equal to the high level of the intermediate voltage multiplied by a predetermined voltage scale-down factor, wherein the predetermined voltage scale-down factor is smaller than one.

4. The switching power conversion circuit of claim 3, wherein the plurality of switching devices of the capacitive power conversion circuit further include:

a third switching device coupled between the input voltage and the first end of the conversion capacitor;

a fourth switching device coupled between the input voltage and the second end of the conversion capacitor; and a fifth switching device coupled between the second end of the conversion capacitor and the ground voltage level;

wherein the first, the third, the fourth and the fifth switching devices operate according to the duty ratio of the switching control signal, so that the conversion capacitor is periodically coupled between the input voltage and the ground voltage level or between the proportional voltage node and the input voltage, thus causing the high level of the intermediate voltage to be approximately equal to a level of the input voltage multiplied by a predetermined voltage scale-up factor, wherein the predetermined voltage scale-up factor is greater than one.

5. The switching power conversion circuit of claim 4, wherein the predetermined voltage scale-up factor is two.

6. The switching power conversion circuit of claim 4, wherein a low level of the intermediate voltage is approximately equal to the level of the input voltage.

7. The switching power conversion circuit of claim 4, wherein during the duty period, the intermediate voltage has the high level, and during a non-duty period, the intermediate voltage has a low level; wherein the non-duty period is an OFF period of the first switching device according to the duty ratio.

8. The switching power conversion circuit of claim 7, wherein the third, the fourth and the fifth switching devices are switches;

wherein during the duty period, the first and the fourth switching devices are controlled to be ON, and the second, the third and the fifth switching devices are controlled to be OFF, so that a connection path between the input voltage and the second end of the conversion capacitor and a connection path between the first end of the conversion capacitor and the proportional voltage node are conductive, thus causing the intermediate voltage to have the high level and the first end of the inductor to have the high level;

during the non-duty period, the second, the third and the fifth switching devices are controlled to be ON, and the first and the fourth switching devices are controlled to be OFF, so that a connection path between the input voltage and the first end of the conversion capacitor, a connection path between the second end of the conversion capacitor and the ground voltage level and a connection path between the first end of the inductor and the ground voltage level are conductive, thus causing the intermediate voltage to have the low level and the first end of the inductor to have the low level.

9. The switching power conversion circuit of claim 4, wherein the first, the third and the fourth switching devices are PMOS transistors, whereas, the second and the fifth switching devices are NMOS transistors.

10. The switching power conversion circuit of claim 3, wherein there is one and only one switch between the first end of the inductor and the first end of the conversion capacitor, and the first switching device corresponds to the one and only one switch.

11. A switching circuit, comprising:
a capacitive power conversion circuit including a plurality of switching devices, wherein the plurality of switching devices of the capacitive power conversion circuit are configured to operably switch a conversion capacitor according to a switching control signal, to convert an input voltage to an intermediate voltage; wherein the plurality of switching devices of the capacitive power conversion circuit include a first switching device, and wherein the intermediate voltage is in a predetermined proportional relationship to the input voltage;
an inductive power conversion circuit including a plurality of switching devices, wherein the plurality of switching devices of the inductive power conversion circuit are configured to operably switch an inductor according to the switching control signal, to convert the intermediate voltage to an output voltage; wherein the plurality of switching devices of the inductive power conversion circuit include the first switching device; and
a switching control circuit, which is configured to operably generate the switching control signal;
wherein the plurality of switching devices of the capacitive power conversion circuit periodically switch a coupling relationship of the conversion capacitor according to a duty ratio of the switching control signal among a proportional voltage node, the input voltage and a ground voltage level, so as to generate the intermediate voltage at a first end of the conversion capacitor, wherein the intermediate voltage has a pulse waveform; wherein the plurality of switching devices of the inductive power conversion circuit periodically switch a coupling relationship of the inductor according to the duty ratio of the switching control signal among the intermediate voltage, the output voltage and the ground voltage level, so as to generate the output voltage, wherein a first end of the inductor is coupled to the proportional voltage node;
wherein a ratio between the output voltage and a high level of the intermediate voltage is correlated to the duty ratio;
wherein the inductive power conversion circuit is configured as a buck switching power conversion circuit, wherein the plurality of switching devices of the inductive power conversion circuit further include a second switching device, wherein the first switching device is coupled between the first end of the conversion capacitor and the proportional voltage node, wherein a second end of the inductor is coupled to the output voltage, and wherein the second switching device is coupled between the proportional voltage node and the ground voltage level;
wherein the capacitive power conversion circuit is configured as a charge pump, wherein the first end of the conversion capacitor is coupled to the input voltage during a first time period of a switching cycle, and a second end of the conversion capacitor is coupled to the input voltage during a second time period of the switching cycle, such that the intermediate voltage is pumped to the high level through a voltage across the conversion capacitor plus the input voltage, so as to render the high level of the intermediate voltage to be higher than the input voltage;
wherein during a duty period, the first switching device turns ON a connection path between the first end of the conversion capacitor and the proportional voltage node, and also turns ON a connection path between the first end of the inductor and the intermediate voltage, wherein the duty period is an ON period of the first switching device according to the duty ratio.

12. The switching circuit of claim 11, wherein a level of the input voltage is selectable to be greater than or smaller than a level of the output voltage.

13. The switching circuit of claim 11, wherein the first switching device is a switch, whereas, the second switching device is a diode or a switch, wherein the first switching device and the second switching device operate according to the duty ratio of the switching control signal, so that the first end of the inductor is periodically coupled to the intermediate voltage or the ground voltage level, thus causing a level of the output voltage to be approximately equal to the high level of the intermediate voltage multiplied by a predetermined voltage scale-down factor, wherein the predetermined voltage scale-down factor is smaller than one.

14. The switching circuit of claim 13, wherein the plurality of switching devices of the capacitive power conversion circuit further include:
a third switching device coupled between the input voltage and the first end of the conversion capacitor;
a fourth switching device coupled between the input voltage and the second end of the conversion capacitor; and
a fifth switching device coupled between the second end of the conversion capacitor and the ground voltage level;
wherein the first, the third, the fourth and the fifth switching devices operate according to the duty ratio of the switching control signal, so that the conversion capacitor is periodically coupled between the input voltage and the ground voltage level or between the proportional voltage node and the input voltage, thus causing the high level of the intermediate voltage to be approximately equal to a level of the input voltage multiplied by a predetermined voltage scale-up factor, wherein the predetermined voltage scale-up factor is greater than one.

15. The switching circuit of claim 14, wherein the predetermined voltage scale-up factor is two.

16. The switching circuit of claim 14, wherein a low level of the intermediate voltage is approximately equal to the level of the input voltage.

17. The switching circuit of claim 14, wherein during the duty period, the intermediate voltage has the high level, and during a non-duty period, the intermediate voltage has a low level; wherein the non-duty period is an OFF period of the first switching device according to the duty ratio.

18. The switching circuit of claim 17, wherein the third, the fourth and the fifth switching devices are switches;
wherein during the duty period, the first and the fourth switching devices are controlled to be ON, and the second, the third and the fifth switching devices are controlled to be OFF, so that a connection path between the input voltage and the second end of the conversion capacitor and a connection path between the first end of the conversion capacitor and the proportional voltage node are conductive, thus causing the intermediate voltage to have the high level and the first end of the inductor to have the high level;

during the non-duty period, the second, the third and the fifth switching devices are controlled to be ON, and the first and the fourth switching devices are controlled to be OFF, so that a connection path between the input voltage and the first end of the conversion capacitor, a connection path between the second end of the conversion capacitor and the ground voltage level and a connection path between the first end of the inductor and the ground voltage level are conductive, thus causing the intermediate voltage to have the low level and the first end of the inductor to have the low level.

19. The switching circuit of claim 14, wherein the first, the third and the fourth switching devices are PMOS transistors, whereas, the second and the fifth switching devices are NMOS transistors.

20. The switching circuit of claim 13, wherein there is one and only one switch between the first end of the inductor and the first end of the conversion capacitor, and the first switching device corresponds to the one and only one switch.

* * * * *